United States Patent [19]

Nishimura et al.

[11] 4,188,095
[45] Feb. 12, 1980

[54] LIQUID TYPE DISPLAY CELLS AND METHOD OF MANUFACTURING THE SAME

[75] Inventors: Katsuo Nishimura; Takanori Nanya, both of Tokorozawa, Japan

[73] Assignee: Citizen Watch Co., Ltd., Tokyo, Japan

[21] Appl. No.: 947,053

[22] Filed: Sep. 29, 1978

Related U.S. Application Data

[62] Division of Ser. No. 709,938, Jul. 29, 1976, abandoned.

[30] Foreign Application Priority Data

Jul. 29, 1975 [JP] Japan .............................. 50-92403
Jul. 29, 1975 [JP] Japan .............................. 50-92406
Aug. 26, 1975 [JP] Japan .............................. 50-102590

[51] Int. Cl.² ........................................... B01J 17/00
[52] U.S. Cl. ................................... 350/357; 29/570; 29/578; 29/580; 156/655; 156/659.1; 156/667; 427/109; 427/126; 430/313
[58] Field of Search ............... 156/655, 656, 659, 667; 29/570, 578, 580; 350/357; 427/109, 108, 126; 96/36

[56] References Cited

U.S. PATENT DOCUMENTS

| | | | |
|---|---|---|---|
| 3,535,137 | 10/1970 | Haller et al. | 156/659 |
| 3,928,658 | 12/1975 | Van Boxtel | 156/656 |
| 3,979,240 | 9/1976 | Ghezzo | 156/657 |
| 3,981,560 | 9/1976 | Heyman et al. | 350/357 |
| 4,009,936 | 3/1977 | Kasai | 350/357 |
| 4,012,831 | 3/1977 | Leibowitz | 29/570 |
| 4,086,003 | 4/1978 | Kouchi et al. | 350/357 |
| 4,123,841 | 11/1978 | Yano et al. | 29/570 |

*Primary Examiner*—Jerome W. Massie
*Attorney, Agent, or Firm*—Sherman & Shalloway

[57] ABSTRACT

In a liquid type display cell wherein a liquid crystal or an electrochromic substance is poured into the space between a pair of substrates through a pouring port of a spacer ring, the pouring port is sealed by an inorganic substance such as solder. Where the cell is provided with display electrodes and electrochromic layers on the electrodes, the display electrodes and the electrochromic layers are etched in one step to have the same pattern.

6 Claims, 23 Drawing Figures

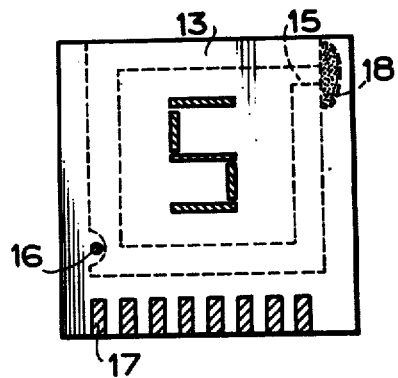
FIG. 4A
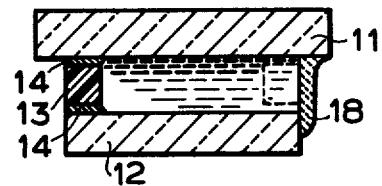
FIG. 4B
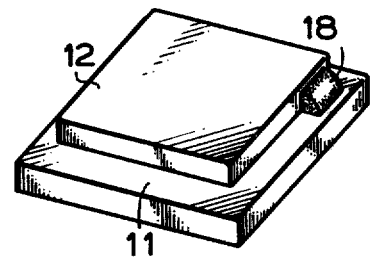
FIG. 4C
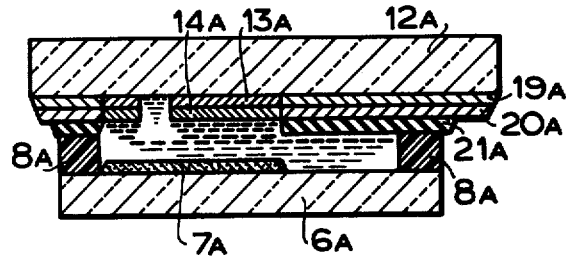
FIG. 6
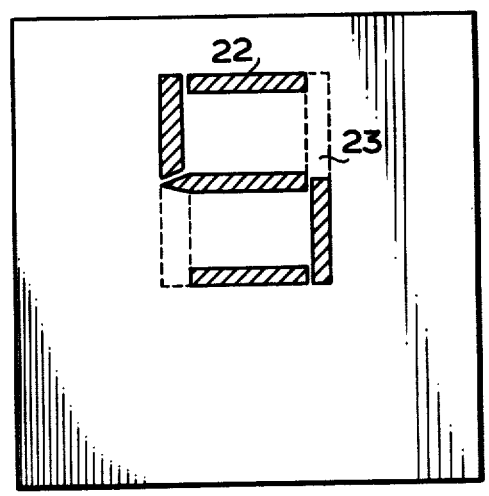
FIG. 7
FIG. 8A
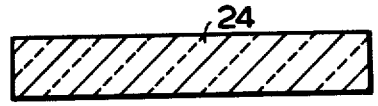
FIG. 8B
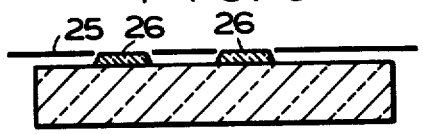
FIG. 8C
FIG. 8D
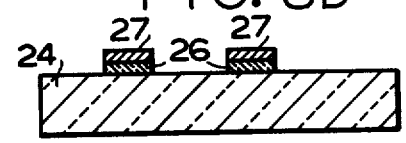

LIQUID TYPE DISPLAY CELLS AND METHOD OF MANUFACTURING THE SAME

This is a division of application Ser. No. 709,938, filed July 29, 1976 now abandoned.

BACKGROUND OF THE INVENTION

This invention relates to a liquid type display cell wherein a flowable substance such as a liquid crystal or an electrochromic substance is sealed between a pair of substrates and a method of manufacturing such a display cell.

As shown by a sectional view shown in FIG. 1, a prior art electrochromic display cell comprises a glass substrate 1 coated with a transparent electroconductive film 2 on which is mounted a thin film 3 of an electrochromic substance, $WO_3$ for example. A substrate 6 made of stainless steel, for example, is secured to the glass substrate 1 by a spacer 4 made of tetrafluoroethylene, for example, and an epoxy bonding agent 5. On the inner surface of substrate 6 a counter electrode 7 made of carbon or $WO_3$ is bonded. Liquid ion conductor 8 filling the space between substrates 1 and 7 comprises a mixture of glycerine, sulfuric acid, $WO_3$ and $TiO_2$. After pouring the mixture into the space through a pouring port 9, the port 9 is sealed by an epoxide sealing agent 10. When a voltage is impressed across the electrochromic film 3 and the counter electrode 7, the electrochromic film 3 emits coloured rays. However, at the same time voltage is also impressed across the transparent electrode 2 made of $SnO_2$ and the counter electrode 7, so that current also flows therebetween thus consuming power. For this reason, it is not advantageous to use an electrochromic cell of this type for an instrument requiring extremely small power consumption such as a wrist watch. Such current also ages the transparent electrode 2 with the result that the electrode 2 becomes opaque and evolves gas.

As described above the prior art liquid crystal or solution type electrochromic display cell is constructed to allow pour liquid to be poured into a space between two substrates and then hermetically seal the cell. Although inorganic sealing agent such as low melting glass is preferred because of its reliability, as the temperature for applying the sealing agent exceeds 400° C. so that the electrodes applied to the substrates and the electrochromic substance are required to withstand against such high temperature.

Where a substance having a low heat resistance property is used for the liquid crystal or solution type electrochromic display cell, it is necessary to use a sealing agent having lower working temperature, for example, an organic bonding agent. However, where the substrates and the liquid pouring port are sealed by such organic sealing agent, it is difficult to perfectly seal the pouring port in an air tight fashion.

FIGS. 2 and 3 are a sectional view and a plan view respectively of a prior art electrochromic display cell utilizing seven segment electrodes wherein a transparent glass substrate 1A is provided with seven electrodes 2A. Lead wires 3A, and a layer of electrochromic substance 4A having an area a little larger than the area of seven electrodes is applied to cover these electrodes. A transparent insulating layer 5A is formed on the lead wires 3A by vapor depositing $SiO_2$ through a mask. A counter electrode 7A consisting essentially of carbon is bonded to the inner surface of a lower substrate 6A. A spacing ring 8A is made of an epoxy resin, and an electrolyte 9A is filled in the space between the upper and lower substrates through a pouring port, not shown. In the case of FIG. 3, five electrode segments are shaded to display digit 5. During operation five, segments 10A are colored but the peripheries of not used segments 11A are also coloured.

To manufacture such an electrochromic display cell provided with seven electrode segments which are selectively energized to display different digits, a transparent electrode consisting essentially of $In_2O_3$ or $SnO_2$ is applied onto the entire surface of a transparent glass substrate by the vapor deposition technique. Seven electrode segments and lead wires are then formed by photoetching technique. Then, electrochromic substance such as $WO_3$, $MoO_3$, mixtures thereof, doped or not doped with other elements is vapor deposited on the electrode segments through a mask provided with perforations corresponding to the electrode segments. On the lead wires a transparent insulating layer is vapor deposited. A counter electrode is formed on the lower substrate. The transparent glass substrate and the lower substrate are placed to oppose each other such that the electrochromic substance and the counter electrode face each other. The peripheries of the upper and lower substrates are sealed and spaced. Thereafter, an electrolyte is poured into the cell and the pouring port is sealed to complete the cell. However, it is extremely difficult or practically impossible to perfectly align the electrode segments formed by photoetching technique and the electrochromic substance vapor deposited through a mask.

The perforations of the mask is slightly enlarged so that the sizes of the electrochromic substance layers will be slightly larger than the sizes of the electrode segments. Although the layers of the electrochromic substance overlying the electrode segments become perfectly chromatic and nonchromatic, the portions of the layers of the electrochromic substance overhanging the electrode segments become perfectly chromatic but their discoloration is not perfect so that after about 1000 operations these overhanging portions form colored edges.

As described above, in an electrochromic display cell having a construction discribed above and manufactured by the above described method, a serious problem of forming colored edges exists. Especially where small display cells are required as in wrist watches, other problems such as vapor deposition to undesired portions and the limits on the accuracy of patterning are also encountered.

SUMMARY OF THE INVENTION

It is an object of this invention to provide an improved liquid type display cell wherein the substrates are spaced and sealed by an organic substance except for a liquid pouring port. The port is sealed by an inorganic substance such as a solder after the liquid has been poured into the cell.

Another object of this invention is to provide a display device and a method of manufacturing the same wherein an electrochromic substance which reversibly becomes electrochromatic and non-chromatic is used and the electrodes and the layers of the electrochromic substance have the same pattern.

A further object of this invention is to provide a novel display device utilizing an electrochromic substance which has reversible luminous and non-luminous properties.

A further object of this invention is to provide a novel electrochromic display device which consumes less power, can obviate the aging of the transparent electrode and has a long operating life.

According to one aspect of this invention there is provided a liquid type display cell of the class comprising a pair of spaced substrates, a spacer having a pouring port, the spacer being hermetically sealed to the peripheries of the substrates except for the pouring port, a liquid crystal or an electrochromic substance poured into the space between the substrates through the pouring port and a sealing member for sealing the pouring port, characterized in that the sealing member is made of an inorganic substance such as a solder.

According to another aspect of this invention there is provided a liquid type electrochromic cell comprising a pair of spaced substrates, pattern display electrodes formed on one substrate, electrochromic layers formed on the electrodes, leads wires formed on the one substrate and connected to the electrodes, a counter electrode formed on the other substrate, an operating liquid filled in the space between the substrates, and an insulating layer overlying the lead wires.

According to still another aspect of this invention, there is provided a method of manufacturing a liquid display cell of the type including electrode layers on a substrate and electrochromic layers on the electrode layers, the electrode layers and the electrochromic layers being arranged in a predetermined pattern, said method comprising the steps of forming an electrode layer on the substrate, forming an electrochromic layer on the electrode layer, and, in one step etching the electrode layer and the electrochromic layer thereby forming a plurality of electrode layers and a plurality of electrochromic layers having the same pattern as the electrode layers.

According to a modified method the electrode layers and the electrochromic layers are formed successively by using a mask in a physical vapor deposition tank, thus forming the electrode layers and the electrochromic layers having the same pattern.

BRIEF DESCRIPTION OF THE DRAWING

Further object and advantages of the invention can be more fully understood from the following detailed description taken in conjunction with the accompanying drawings in which:

FIG. 4A is a plan view of a liquid type display cell embodying the invention;

FIG. 4B is a sectional view of the display cell shown in FIG. 4A;

FIG. 4C is an inverted perspective view of the display cell shown in FIGS. 4A and 4B;

FIG. 6 is a sectional view showing a completed electrochromic display device;

FIG. 7 is a plan view of the display device shown in FIG. 6;

FIGS. 8A through 8D are side views showing various steps of a mask vapor deposition process of a modified embodiment of this invention;

DESCRIPTION OF THE PREFERRED EMBODIMENTS

Figure 1:
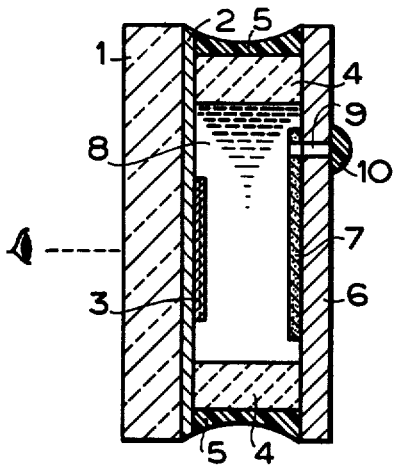
FIG. 1 is a sectional view showing a prior art electrochromic display cell.

A preferred embodiment of this invention shown in FIGS. 4A, 4B and 4C comprises an upper transparent glass substrate 11, a lower glass substrate 12 and, a spacer 13 made of polyethylene bonded to the upper and lower substrate by layers of bonding agent 14 consisting of an epoxy resin. The epoxy resin layers 14 are applied to the substrates by a screen printing technique. The spacer 13 takes the form of a rectangular frame provided with a pouring port 15. An electroconducting member 16 for electrically interconnecting the upper and lower substrates is formed by applying a silver type paste utilized to form thick films. The electroconducting member 16 is used to apply the voltage applied to the electrodes of the upper substrate 11 through terminals 17 and also to the electrodes, not shown, of the lower substrate 12. After bonding together the upper and lower substrates by the layers 14 of the epoxy resin, a thin film of Cr or Pd is formed by vapor deposition at and near the pouring port 15 for making easy to solder. Then an ion conductor is poured into the space defined by the upper and lower substrates and the spacer through the pouring port 15 and finally the pouring port is sealed by applying a solder 18. In addition to a conventional solder, metal such as indium can also be used. Further, epoxy resin can be replaced by a silicone resin.

Although in the embodiment shown in FIG. 4 glass substrates were used, it is also possible to use substrates made of metal or plastics. Further, the invention is also applicable to a so-called twisted nematic liquid crystal display cell.

In the liquid type display cell described above wherein a flowable substance such as a liquid crystal or an electrochromic substance is sealed between a pair of substrates, the peripheries of the substrates except the pouring pot are sealed by an organic substance and after pouring the liquid into the cell the pouring port is sealed by an inorganic substance i.e. a solder, so that the reliability of the seal of the pouring port is improved. In addition, this method enables to adopt mass production technique, thus decreasing the manufacturing cost of the display cell.

Figure 5A:
FIGS. 5A through 5G are side views showing various steps of manufacturing, by etching, electrodes on a transparent glass substrate and an electrochromic layer of an electrochromic display device of this invention.
Figure 5B:
Figure 5C:
Figure 5D:
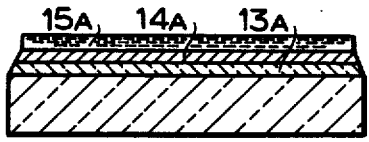
Figure 5E:
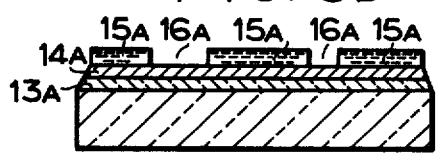
Figure 5F:
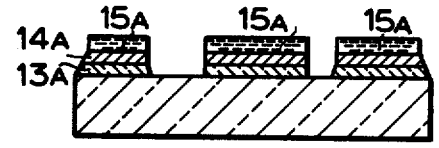
Figure 5G:
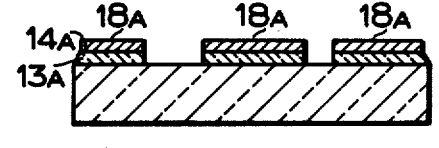

FIG. 5A through 5G show successive steps of forming electrodes and electrochromic layers by a simultaneous photoetching process. More particularly, as shown in FIG. 5B, a layer of a transparent electrode 13A consisting of $In_2O_3$ or $SnO_2$, for example, is formed on the entire surface of a transparent glass substrate 12A shown in FIG. 5A by vapor deposition and a layer 14A of electrochromic substance is formed on the entire surface of the electrode layer 13A by vapor deposition as shown in FIG. 5C. Thereafter the layers of the transparent electrode and the electrochromic substance are simultaneously photoetched according to the same pattern. Thus, as shown in FIG. 5D after a film of a spinner liquid 15A has been applied the assembly is subjected to exposure and development steps thus forming islands 15A separated by removed portions 16A as shown in FIG. 5E. Then, the layers of the transparent electrode and the electrochromic substance are etched simultaneously as shown by FIG. 5F. Finally, the remaining spinner layer 15A is removed by a solvent as shown in FIG. 5G, thus forming islands 18A each comprising the layer of the transparent electrode and the layer of the electrochromic substance. Then, the assembly thus obtained is dried.

One example of the conditions of the simultaneous etching process is as follows:

| | | |
|---|---|---|
| 1. Spinner | 8,000 rpm | 5 sec. |
| 2. Preliminary baking | 80°–90° C. | 10 min. |
| 3. Exposure | 250W lamp | 3 sec. |
| 4. Development | 24° C. | 2 min. |
| 5. Post baking | 90° C. | 5 min. |
| 6. Etching solution | 20% aqueous solution of $H_2SO_4$, 24° C. | 20 sec. |
| 7. Washing | | |
| 8. Drying | | |

Figure 2:
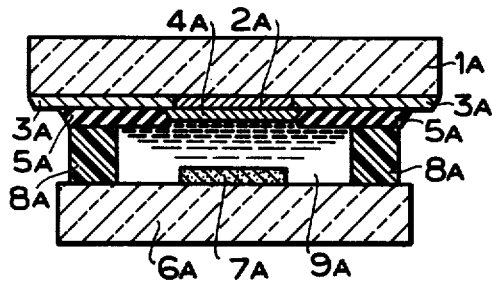
FIG. 2 is a sectional view showing another example of a prior art electrochromic display cell.
Figure 3:
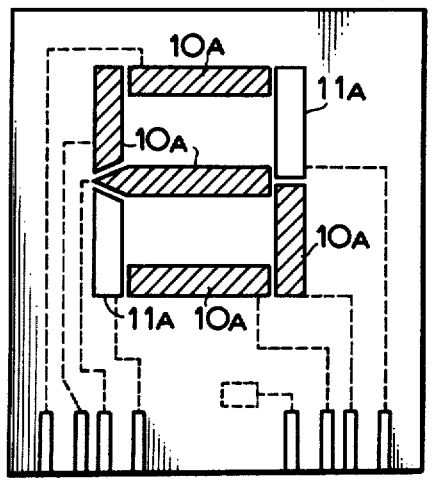
FIG. 3 is a plan view of the display cell shown in FIG. 2.

FIG. 6 is a sectional view of an electrochromic display cell using a transparent substrate 12A etched according to the process steps described above. As shown, an electrochromic layer 14A is formed on a transparent electrode layer 13A. Further, transparent lead wires 19A, an electrochromic lead layer 20A and a transparent insulating layer 21A, which are laminated in the order mentioned, are provided. Remaining component elements are identical to those shown in FIG. 2. Since the electrochromic layer 14A has just the same pattern as the transparent electrode layer 13A, it becomes electrochromatic and non-electrochromatic as desired so that no colored edges are formed after several tens of thousands of operations.

FIG. 7 shows a plan view of the electrochromic cell. As shown, the energized or colored electrode segments 22 are shown shaded, whereas not energized segments 23 have no colored edges different from those shown in FIG. 5.

As has been described hereinabove since the transparent electrode layer 13A and the electrochromic layer 14A are formed by the one-step photoetching process, it is possible to form a fine pattern having a line width of 20 to 50 microns and a line spacing of 20 to 50 microns. Therefore, the invention is especially applicable to small display cells for use in wrist watches, or like small instrument.

FIGS. 8A through 8D show another embodiment of this invention which is suitable to manufacture display cells having a coarse pattern for a clock, or the like. More particularly, after working and rinsing a transparent glass substrate 24 shown in FIG. 8A, transparent electrode layers 26 are vapor deposited by using a mask 25 having a predetermined pattern as shown in FIG. 8B. Then, as shown in FIG. 8C, electrochromic layers 27 are vapor deposited on the transparent electrode layers by using the same mask. Then, the mask is removed to leave an assembly as shown in FIG. 8D.

In the embodiment shown in FIG. 8, the electrode layer and the electrochromic layer having the same pattern are successively formed in a physical vapor deposition vacuum tank by using a mask. It will be clear that the electrode film and the electrochromic layer of the same pattern can also be formed by a spatter etching technique.

The feature of this invention lies in that the electrode layer and the electrochromic layer have the same pattern which is to be displayed. For example, the electrode layer and the electrochromic layer are formed in the form of seven segments. It is also possible to not form an electrochromic layer on the lead wires which are used to connect the electrode layers to an external circuit.

Thus, the invention provides a display device in which the electrode layer and the electrochromic layer have the same pattern which eliminates the problem of forming colored edges which have been inevitable in the prior art display cell. Consequently, the display device of this invention is easy to view, and has a long life. As the electrode layer and the electrochromic layer can be formed in one step to have the same pattern by etching, it is possible to provide display devices capable of displaying accurate and precise patterns required by digital timepieces or the like.

Figures 9, 10:
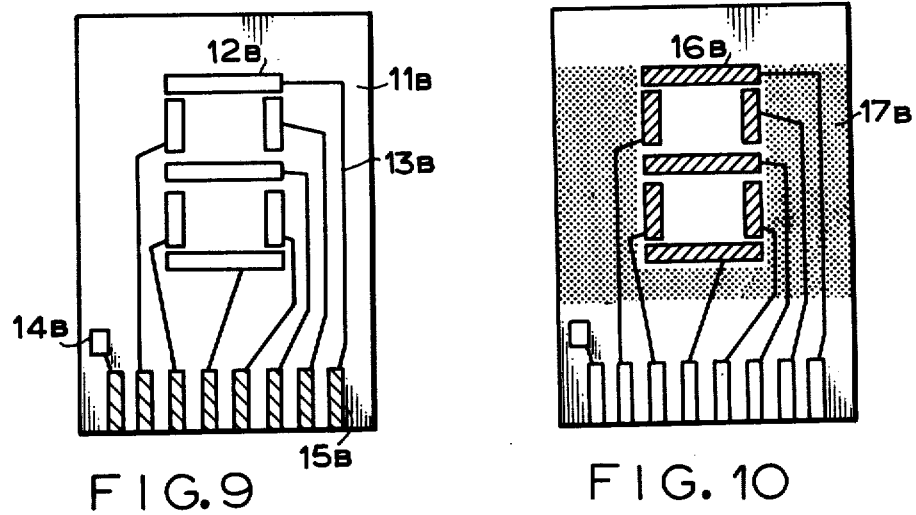
FIGS. 9 and 10 are plan views of an electrochromic display device of this invention.

FIG. 9 is a plan view showing the upper glass substrate of a modified electrochromic display device of this invention. After vapor deposition, a transparent conductive film consisting of $SnO_2$ or $In_2O_3$ on the entire surface of a glass substrate the conductive film is separated into seven electrode segments 12B and lead wires 13B. An electric conductor 14B for electrically interconnecting upper and lower electrodes, and terminals 15B are also formed simultaneously. Then, as shown in FIG. 10, electrochromic layers 16B consisting of $WO_3$ or $MoO_3$ and having a thickness of 0.5 to 1 micron are formed on the electrode segments by vapor deposition through a mask and a transparent insulating layer 17B consisting of $SiO_2$ is vapor deposited on the lead wires 13B.

Figure 11:
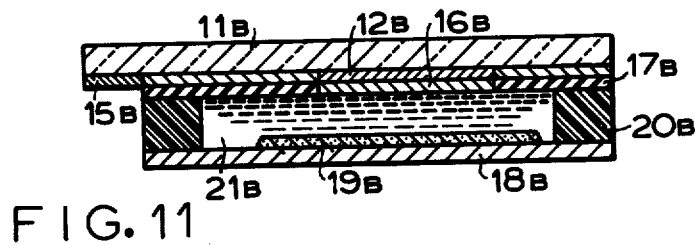
FIG. 11 is a sectional view of a modified electrochromic display device of this invention.

FIG. 11 is a sectional view showing an electrochromic display device utilizing the upper glass substrate 11B thus prepared. The lower substrate 18B may be made of stainless steel or glass and a counter electrode 19B consisting essentially of carbon is formed thereon by printing. The peripheral spacer and bonding ring 20B are formed by printing an epoxy resin containing fine particles of an insulator having a definite particle size and then heat hardening. The thickness of the spacer ring 20B is selected to assure a constant gap of 200 to 500 microns between the upper glass substrate 11B and the lower substrate 18B although not shown in the drawing. The counter electrode 19B and the conductor 14B are electrically interconnected by a silver paste, for example, on the outside of the spacer ring 20B so as to apply to them voltage through terminals 15B. Further, the pouring port for pouring an electrolyte 21B and the seal of the pouring port are not shown. The transparent insulator layer 17B prevents current from flowing between the lead wires 13B and the counter electrode 19B and only the electrochromic layer 16B consumes power.

Figure 12:
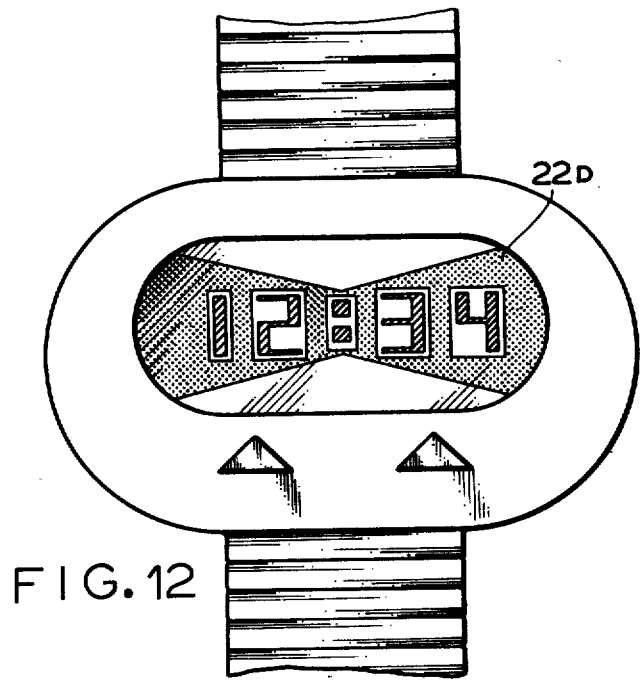
FIG. 12 is a schematic plan view of a wrist watch utilizing the electrochromic display device of this invention.

FIG. 12 is a plan view of a digital crystal watch utilizing the electrochromic devices of this invention in which an insulating layer 22D is colored and may be provided with an ornamental pattern. The insulating layer may be prepared by a thick film screen printing process.

As above described, the insulating layer formed on the lead wires not only prevents waste of power but also protect the lead wires, thus elongating the life of the electrochromic display device. Accordingly, this modification is suitable to instruments requiring high reliability and low power consumption as small timepieces.

What is claimed is:

1. A method of manufacturing a liquid display cell of the type including electrode layers on a substrate and electrochromic layers on said electrode layers, said electrode layers and said electrochromic layers being arrange in a predetermined pattern, said method comprising the steps of forming an electrode layer on said substrate, forming an electrochromic layer on said electrode layer, and photoetching in one step said electrode layer and said electrochromic layer thereby forming a plurality of electrode layers and a plurality of electrochromic layers having the same pattern as said electrode layers.

2. The method of claim 1 wherein said photoetching includes the steps of:

applying a spinner liquid to said electrode layer and said electrochromic layer;

exposing the applied spinner liquid;

developing the exposed, applied spinner liquid;

etching, in one step, the layers of said transparent electrode and said electrochromic substance; and applying a solvent to remove the remaining spinner layer.

3. The method of claim 1 wherein the step of forming said electrode layer is performed by vapor depositing $In_2O_3$ on said substrate.

4. The method of claim 1 wherein the step of forming said electrode layer is performed by vapor depositing $SnO_2$ on said substrate.

5. The method of claim 3 or 4 wherein said electrochromic layer is formed by vapor depositing an electrochromic substance on said electrode layer.

6. A liquid electrochromic display cell of the type including electrode layers formed on a substrate and electrochromic layers on said electrode layers manufactured by the method of claim 1.

* * * * *